United States Patent
Hong

(10) Patent No.: US 12,520,267 B2
(45) Date of Patent: Jan. 6, 2026

(54) POSITION DETERMINING METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 332 days.

(21) Appl. No.: 18/013,383

(22) PCT Filed: Jul. 28, 2020

(86) PCT No.: PCT/CN2020/105312
§ 371 (c)(1),
(2) Date: Dec. 28, 2022

(87) PCT Pub. No.: WO2022/021100
PCT Pub. Date: Feb. 3, 2022

(65) Prior Publication Data
US 2023/0239830 A1    Jul. 27, 2023

(51) Int. Cl.
*H04W 64/00* (2009.01)
*H04W 24/08* (2009.01)
*H04B 7/185* (2006.01)

(52) U.S. Cl.
CPC ........... *H04W 64/00* (2013.01); *H04W 24/08* (2013.01); *H04B 7/18513* (2013.01)

(58) Field of Classification Search
CPC ..... H04W 64/00; H04W 84/06; H04W 24/08; H04W 36/0085; H04W 36/08;
(Continued)

(56) References Cited

U.S. PATENT DOCUMENTS

| | | | |
|---|---|---|---|
| 2008/0170536 A1* | 7/2008 | Marshack | H04B 7/1858 370/316 |
| 2008/0191933 A1* | 8/2008 | Wigren | G01S 19/06 342/357.34 |

(Continued)

FOREIGN PATENT DOCUMENTS

| | | |
|---|---|---|
| CN | 103974275 A | 8/2014 |
| KR | 20150110568 A | 10/2015 |

(Continued)

OTHER PUBLICATIONS

International Search Report and Written Opinion of International Application No. PCT/CN2020/105312, mailed Apr. 27, 2021, 14 pages.

(Continued)

*Primary Examiner* — Keith Ferguson
(74) *Attorney, Agent, or Firm* — Finnegan, Henderson, Farabow, Garrett & Dunner, L.L.P.

(57) ABSTRACT

A method for determining a location is performed by a user equipment (UE), and includes: determining a location relationship of the UE with respect to a serving cell according to a measured positioning measurement result of a wireless signal transmitted by an aerial access network equipment in the serving cell, wherein the positioning measurement result indicates a location relationship of the UE with respect to the aerial access network equipment.

16 Claims, 8 Drawing Sheets

(58) Field of Classification Search
CPC .. H04W 4/029; H04W 72/23; H04B 7/18513; H04B 7/18541
See application file for complete search history.

(56) References Cited

U.S. PATENT DOCUMENTS

| | | | |
|---|---|---|---|
| 2012/0003995 A1* | 1/2012 | Ishii | G01S 5/14 455/517 |
| 2018/0164442 A1* | 6/2018 | Thrasher | G01S 19/54 |
| 2020/0052850 A1* | 2/2020 | Yuan | H04W 72/044 |
| 2021/0175985 A1* | 6/2021 | Yoon | H04W 56/00 |

FOREIGN PATENT DOCUMENTS

| | | |
|---|---|---|
| WO | WO 2019097922 A1 | 5/2019 |
| WO | WO 2019195457 A1 | 10/2019 |
| WO | 2020001731 A1 | 1/2020 |
| WO | 2020144572 A1 | 7/2020 |

OTHER PUBLICATIONS

Notice of Reasons for Refusal for Japanese Patent Application No. 2022-581642, issued on Nov. 17, 2023, 13 pages.
Catt, Thales, "Measurement Initiation Issue for NTN System", 3GPP TSG-RAN WG2 Meeting #108, R2-1916521, Reno, USA, Nov. 18-22, 2019, 9 pages.
Request for the Submission of an Opinion for Korean Application No. 10-2023-7002797, dated Jun. 28, 2025, 19 pages.
Invitation to Respond to Written Opinion issued by the Intellectual Property Office of Singapore on Oct. 1, 2025, in corresponding Application No. SG 11202261637V, 9 pages.

* cited by examiner

POSITION DETERMINING METHOD AND APPARATUS, AND COMMUNICATION DEVICE AND STORAGE MEDIUM

CROSS-REFERENCE TO RELATED APPLICATION

This application is the US national phase application of International Application No. PCT/CN2020/105312, filed on Jul. 28, 2020, the entire contents of which are incorporated herein by reference.

TECHNICAL FIELD

The present disclosure relates to the technical field of wireless communication but is not limited to the technical field of wireless communication, and in particular relates to a method and apparatus for determining a location, a communication device and a storage medium.

BACKGROUND

Terrestrial mobile communication has entered the era of $5^{th}$ Generation (5G) cellular mobile communication, and the integration of satellite communication and 5G terrestrial mobile communication will realize a space-terrestrial integrated network. Non-terrestrial network (NTN, Non-Terrestrial Networks) scenarios in 5G cellular mobile communication networks include 8 enhanced mobile broadband (eMBB) scenarios and 2 massive machine type communication (mMTC) scenarios. With the help of the satellite's wide-area coverage capability, operators can provide 5G commercial services in areas with underdeveloped terrestrial network infrastructure, and achieve 5G service continuity, especially in the scenarios such as emergency communications, maritime communications, aviation communications, and communications along railways.

In non-terrestrial network scenarios, due to the rapid change of the position of the satellite with respect to the ground, the continuous coverage time of a terminal by the same satellite is only over ten minutes. For low-orbit satellites with multiple beams, the continuous coverage time of the same beam is only a few minutes. Therefore, how to switch quickly and accurately is a problem that needs to be considered in non-terrestrial network scenarios.

SUMMARY

According to a first aspect of the present disclosure, a method for determining a location is provided. The method is performed by a user equipment (UE), and the method includes:
  determining a location relationship of the UE with respect to a serving cell according to a measured positioning measurement result of a wireless signal transmitted by an aerial access network equipment in the serving cell, wherein the positioning measurement result indicates a location relationship of the UE with respect to an aerial access network equipment.

According to a second aspect of the present disclosure, a method for determining a location is provided. The method is performed by an aerial access network equipment, and the method includes:
  sending location indication information indicating an altitude of the aerial access network equipment, wherein the location indication information is configured to determine a location relationship of a UE with respect to a serving cell.

According to a third aspect of the present disclosure, a communication device is provided, including:
  a processor; and
  a memory, coupled to the processor, and stored with a computer executable program for determining a location, wherein when the computer executable program is executed, the processor is caused to implement steps of the method for determining a location as described in the first aspect or the second aspect.

It should be understood that the above general description and the following detailed description are only illustrative and explanatory, and do not limit the embodiments of the present disclosure.

BRIEF DESCRIPTION OF THE DRAWINGS

The Figures herein are incorporated into the specification and constitute a part of the specification, showing that they conform to the embodiments of the disclosure, and are used together with the specification to explain the principles of the embodiments of the disclosure.

DETAILED DESCRIPTION

Reference will now be made in detail to the embodiments, examples of which are illustrated in the accompanying drawings. When the following description refers to the accompanying drawings, the same numerals in different drawings refer to the same or similar elements unless otherwise indicated. The implementations described in the following embodiments do not represent all implementations consistent with the embodiments of the present disclosure. Rather, they are merely examples of devices and methods consistent with aspects of the embodiments of the disclosure as recited in the appended claims.

Terms used in the embodiments of the present disclosure are for the purpose of describing specific embodiments only, and are not intended to limit the embodiments of the present disclosure. As used in the examples of this disclosure and the appended claims, the singular forms "a", "said" and "the" are also intended to include the plural forms unless the context clearly dictates otherwise. It should also be understood that the term "and/or" as used herein refers to and includes any and all possible combinations of one or more of the associated listed items.

It should be understood that although the embodiments of the present disclosure may use the terms first, second, third, etc. to describe various information, the information should not be limited to these terms. These terms are only used to distinguish information of the same type from one another. For example, without departing from the scope of the embodiments of the present disclosure, first information may also be called second information, and similarly, second information may also be called first information. Depending on the context, the word "if" as used herein may be interpreted as "at" or "when" or "in response to a determination."

Figure 1:
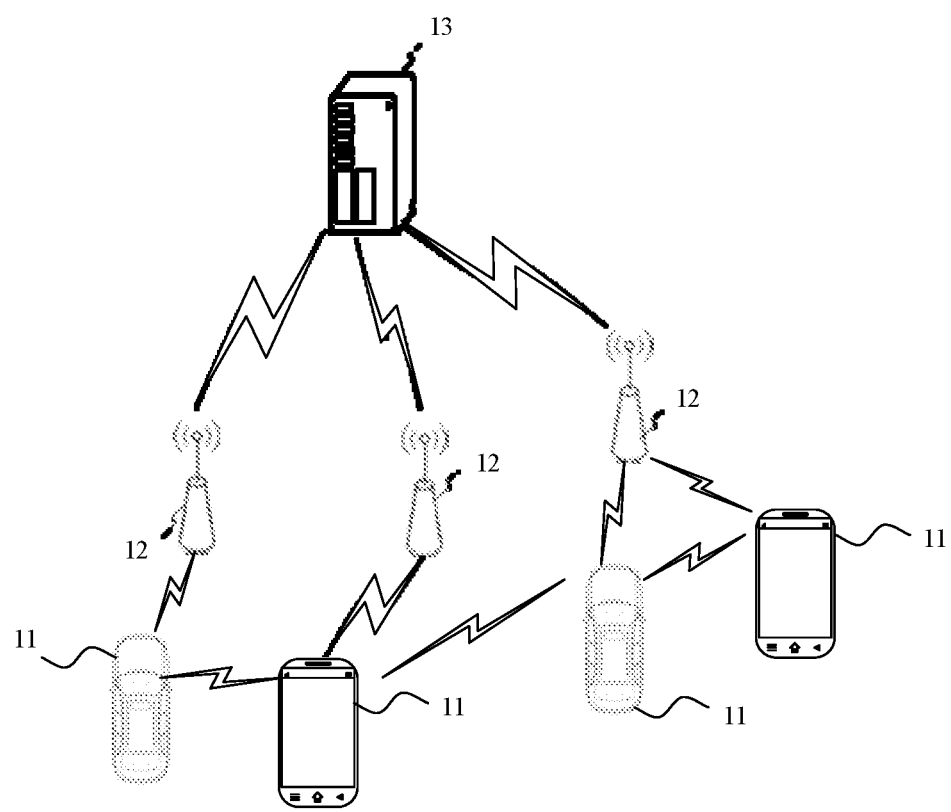
FIG. 1 is a diagram showing a structure of a communication system shown according to an embodiment.

Please refer to FIG. 1, which shows a schematic structural diagram of a wireless communication system provided by an embodiment of the present disclosure. As shown in FIG. 1, the wireless communication system is a communication system based on cellular mobile communication technology, and the wireless communication system may include several terminals 11 and several base stations 12.

The terminal 11 may be a device that provides voice and/or data connectivity to the user. The terminal 11 can communicate with one or more core networks via a radio access network (RAN), and the terminal 11 may be an internet of things (IoT) terminal, such as a sensor device, a mobile phone (or called a "cellular" phone) and a computer having the IoT terminal, and may be a fixed, portable, pocket, hand-held, built-in computer or vehicle-mounted device, such as a station (STA), a subscriber unit, a subscriber station, a mobile station, a mobile, a remote station, an access point, a remote terminal, an access terminal, a user terminal, a user agent, a user device, and a user equipment (UE). Alternatively, the terminal 11 may be a device of an unmanned aerial vehicle. Alternatively, the terminal 11 may be a vehicle-mounted device, such as a trip computer with a wireless communication function, or a wireless communication device connected externally to the trip computer. Alternatively, the terminal 11 may be a roadside device, such as a street lamp, a signal lamp, or other roadside devices with a wireless communication function.

The base station 12 may be a network side device in a wireless communication system. The wireless communication system may be a $4^{th}$ generation mobile communication (4G) system, also known as a long term evolution (LTE) system, or the wireless communication system may also be a 5G system, also known as new radio (NR) system or 5G NR system. Alternatively, the wireless communication system may also be a next-generation system of the 5G system, and the access network in the 5G system may be called New Generation-Radio Access Network (NG-RAN). Alternatively, the wireless communication system may also be an MTC system.

The base station 12 may be an evolved Node B (eNB) adopted in a 4G system. Alternatively, the base station 12 may also be a generation Node B (gNB) adopting a centralized and distributed architecture in the 5G system. When the base station 12 adopts a centralized and distributed architecture, it generally includes a centralized unit (CU) and at least two distributed units (DU). The centralized unit is provided with protocol stacks of a packet data convergence protocol (PDCP) layer, a radio link control (RLC) layer and a media access control (MAC) layer, and the distributed units are provided with a protocol stack of a physical (PHY) layer. The embodiment of the present disclosure does not limit the specific implementation manner of the base station 12.

A wireless connection can be established between the base station 12 and the terminal 11 through a wireless air interface. In different embodiments, the wireless air interface may be a wireless air interface based on the 4G standard, or, the wireless air interface may be a wireless air interface based on the 5G standard, such as a new air interface; alternatively, the wireless air interface may be a wireless air interface based on a technical standard of a next-generation mobile communication network of 5G.

In some embodiments, an end to end connection may also be established between terminals 11, such as in the scenarios of vehicle to vehicle communication, vehicle to infrastructure communication, and vehicle to pedestrian communication in vehicle to everything communication.

In some embodiments, the above wireless communication system may further include a network management device 13.

Several base stations 12 are connected to network management equipment 13 respectively. The network management device 13 may be a core network device in the wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules functional unit (PCRF) or home subscriber server (HSS). The implementation of the network management device 13 is not limited in the embodiments of the present disclosure.

Executive bodies involved in the embodiments of the present disclosure include, but are not limited to: an aerial access network equipment supporting cellular mobile communications, such as a base station, and a core network equipment.

Figure 2:
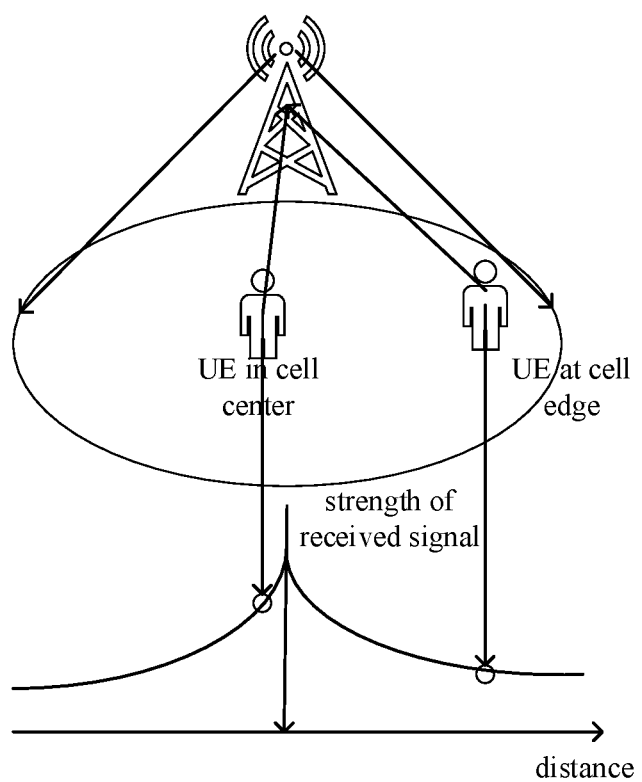
FIG. 2 is a diagram illustrating a cell handover determination of a related technology according to an embodiment.

An application scenario of an embodiment of the present disclosure is that, as shown in FIG. 2, in a terrestrial network system, there is a large difference in the received signal strength measured by the UE at the center of the cell and at the edge of the cell, the difference in the received signal strength can be configured to determine whether the UE is at the edge of the cell, further to determine whether to reselect a cell or switch a cell.

Figure 3:
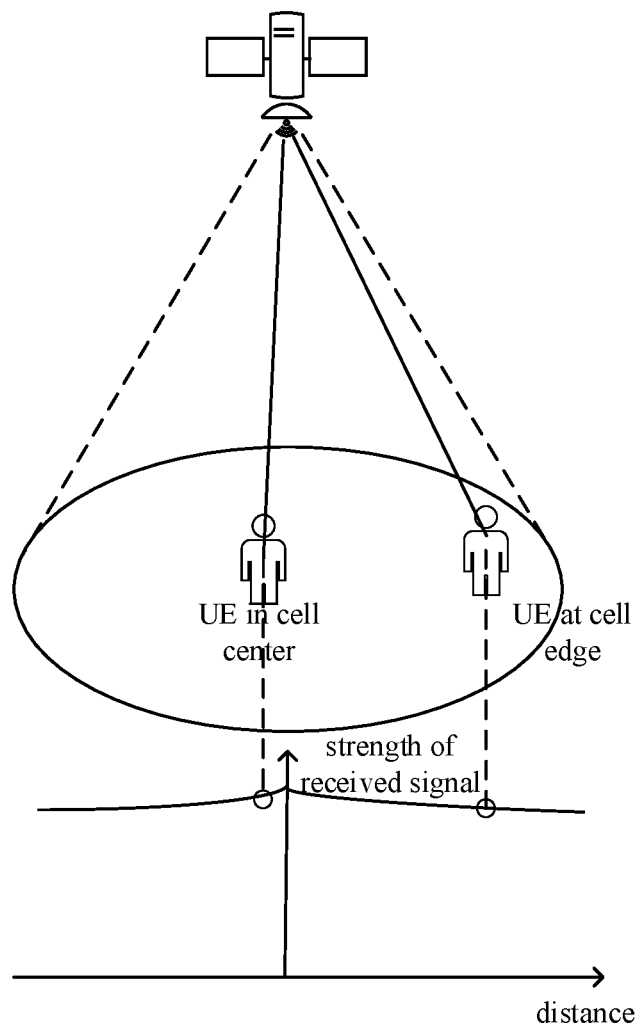
FIG. 3 is a diagram of a cell handover determination of another related technology shown according to an embodiment.

As shown in FIG. 3, in non-terrestrial network systems, due to the longer propagation distance, the altitude of the low earth orbit (LEO) satellite can reach 300-1500 kilometers, and there is little change in the received signal strength measured by the terminal UE at the center and the edge of the cell. If the original 5G NR cell reselection and RSRP/RSRQ measurement reporting mechanism are applied in the non-terrestrial network system, it is difficult for the terminal UE or NTN base station (gNB) or terrestrial gNB to accurately determine whether the terminal UE is at the edge of the cell. In the idle state, it is difficult to accurately determine whether it is needed to initiate neighbor cell measurement for possible cell reselection. In the connected state, it is difficult for NTN gNB or terrestrial gNB to accurately determine whether it is needed to initiate a cell handover process.

Figure 4:
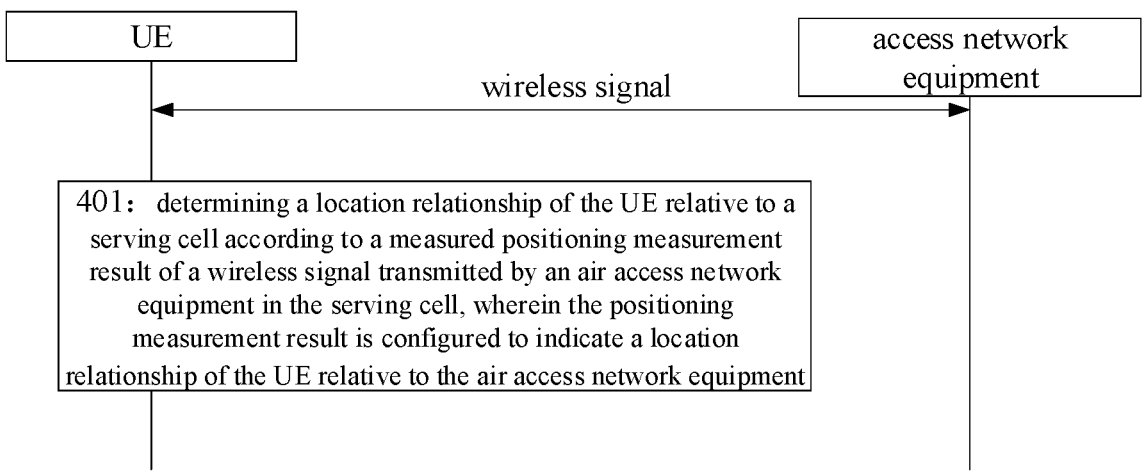
FIG. 4 is a flow diagram illustrating a method for determining a location according to an embodiment.

As shown in FIG. 4, this embodiment provides a method for determining a location, which can be applied to a UE in wireless communication. The method for determining a location may include:

Step 401: determining a location relationship of the UE with respect to a serving cell according to a measured positioning measurement result of a wireless signal transmitted by an aerial access network equipment in the serving cell; wherein the positioning measurement result indicates a location relationship of the UE with respect to an aerial access network equipment.

The UE may be a mobile phone terminal or the like that uses cellular mobile communication network technology for wireless communication. The aerial access network equipment can be an NTN base station of a cellular mobile communication network, such as a satellite, or a small base station carried by a high-altitude balloon.

The measurement result may be the relative location relationship between the UE and the aerial access network equipment obtained by the UE based on the measurement of the transmission signal of the aerial access network equipment in the serving cell. For example, the UE may measure time of flight (TOF) of the transmission signal of the aerial access network equipment and the angle of arrival, etc. According to the time of flight, the signal flight distance between the UE and the aerial access network equipment can be determined, that is, the distance between the UE and the aerial access network equipment.

As shown in FIG. 3, since the signal coverage of the NTN base station is relatively fixed in space, the signal coverage of the NTN base station is in the shape of a cone. The UE may determine the relative location relationship with the NTN base station based on measurement results such as the time of flight and angle of arrival of the signal, to further determine the location of the UE in the serving cell.

Figure 5:
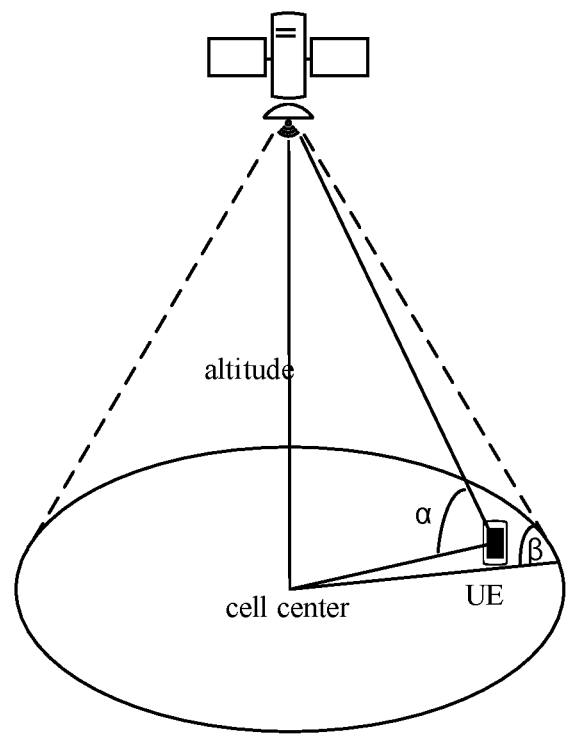
FIG. 5 is a diagram illustrating a mutual positional relationship according to an embodiment.

Exemplarily, as shown in FIG. 5, the NTN base station sends wireless signals to the ground in the air, to form a serving cell of the UE on the ground. The center point of the serving cell may be the vertical projection point of the NTN base station on the ground. In the cone signal coverage area, the angle between the cone edge and the cone base is $\beta$. If the arrival angle $\alpha$ of the wireless signal received by the UE is greater than or equal to $\beta$, the UE is considered to be inside the serving cell. If $\alpha$ is less than $\beta$, the UE is considered to be outside the serving cell. Here, the angle $\beta$ between the cone edge and the cone base can be determined according to the beam of the NTN base station.

Figure 6:
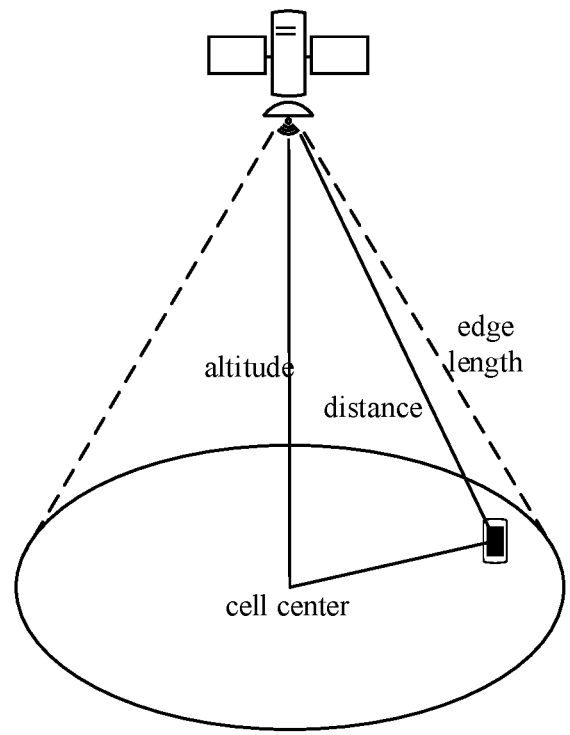
FIG. 6 is a schematic diagram of another mutual positional relationship shown according to an embodiment.

The UE can measure the time of flight of the signal transmitted by the NTN base station. When the NTN base station transmits the signal, the signal can carry information about the transmission time point. The UE can determine the time of flight of the signal based on the signal reception time point and the transmission time point in combination with the signal propagation speed. As shown in FIG. 6, in the cone signal coverage area formed by the serving cell, the longest time of flight of the signal transmitted by the NTN base station is the edge length of the cone. If the flight distance of the wireless signal received by the UE is less than or equal to the edge length of the cone, then it is considered that the UE is inside the serving cell, and if the flight distance is greater than the edge length, the UE is considered to be outside the serving cell. Here, the edge length of the cone can be determined according to the beam of the NTN base station.

The determined location relationship between the UE and the serving cell may be applied to determine whether it is needed to switch cells, etc. Here, switching cells may include: performing a cell reselection in a case that the UE is in an idle state, or performing an inter-cell handover in a case that the UE is in a connected state.

Here, the edge length and the angle value $\beta$ can be predetermined, can be broadcast to the UE by the aerial access network equipment via a system message, or sent to the UE via RRC signaling.

In this way, for mobile aerial access network equipment such as NTN base stations, the relative location of the UE and the aerial access network equipment is determined by measuring the wireless signal of the serving cell, to further determine the location relationship between the UE and the serving cell, and the precision of location determination in the serving cell by the UE is improved. Furthermore, it is possible to accurately determine whether to perform an inter-cell handover, and reduce inaccuracy in determining the timing of handover by using the reception strength of wireless signal and the like.

In one embodiment, the method further includes: receiving location indication information indicating an altitude of the aerial access network equipment;

the determining a location relationship of the UE with respect to a serving cell according to a measured positioning measurement result of a wireless signal transmitted by an aerial access network equipment in the serving cell includes:

determining a distance between the UE and a center point of the serving cell according to the location indication information and the positioning measurement result.

The location indication information may be configured to indicate the position of the aerial access network equipment such as the NTN base station, for example, the altitude of the aerial access network equipment. Here, the altitude of the aerial access network equipment may be the vertical length from the aerial access network equipment to the ground. When the NTN base station and the like indicate the aerial access network equipment to transmit signals to the ground, the transmission is usually performed vertically to the ground, so a circular signal coverage area is formed on the ground. The center of the circular signal coverage area is the vertical projection point of the aerial access network equipment, which is also the center of the cell. In addition, even if the aerial access network equipment does not transmit wireless signals vertically to the ground, the angle at which it transmits wireless signals to the ground may be fixed or periodically changed. The angle may be notified to the UE in real time through wireless signaling, or may be known in advance by the aerial access network equipment or the UE (for example, through a communication protocol). The aerial access network equipment or UE can obtain the center location of the serving cell associated with the aerial access network equipment according to the angle and the altitude of the aerial access network equipment, so as to determine the distance of the UE with respect to the center point of the serving cell.

The NTN base station may send the location indication information to the UE through a broadcast system message or RRC signaling that carries the location indication information.

The NTN base station can directly send the location indication information to the UE, or the ground station of the NTN base station (that is, the ground base station) can send the location indication information to the UE via the NTN base station.

The UE establishes a communication connection with the NTN base station in the serving cell, and the NTN base station sends indication information to the UE to indicate the altitude of the NTN base station from the ground.

After the UE determines the altitude of the NTN base station from the ground, the UE can determine the distance from the UE to the center of the serving cell according to the measurement results such as the time of flight and angle of arrival of the signal and by using the Pythagorean Theorem.

In this way, the accurate calculation of the distance from the UE to the center of the serving cell can be realized, and the accuracy of the distance calculation from the UE to the serving cell can be improved.

In one embodiment, the determining a distance between the UE and a center point of the serving cell according to the location indication information and the positioning measurement result includes at least one of the following:

determining the distance between the UE and the center point of the serving cell according to the altitude of the aerial access network equipment and an angle of arrival of the wireless signal; and determining the distance between the UE and the center point of the serving cell according to the altitude of the aerial access network equipment and the distance between the UE and the aerial access network equipment.

Figure 7:
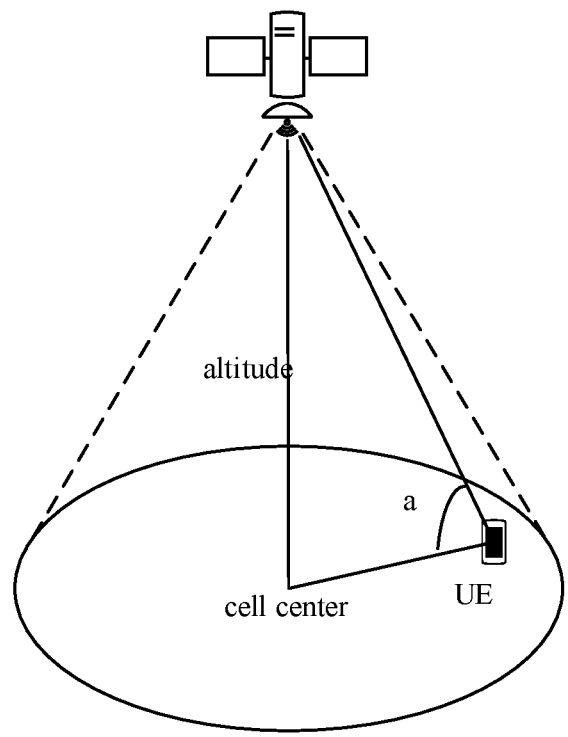
FIG. 7 is a schematic diagram of another mutual positional relationship shown according to an embodiment.

As shown in FIG. 7, on the premise that the altitude of the aerial access network equipment and the angle of arrival of the wireless signal transmitted by the aerial access network equipment are known, the distance between the UE and the center of the serving cell can be determined based on trigonometric function relations and the like.

As shown in FIG. 6, the UE can determine the distance between the UE and the aerial access network equipment according to its own positioning information and the position of the aerial access network equipment such as satellites obtained from the ephemeris table. For example, the positioning information of the UE is obtained through satellite positioning systems such as the Global Positioning System (GPS) and the BeiDou Navigation Satellite System (BDS), or through the approximate location of the terminal notified by the base station or other network-side equipment. On the premise of knowing the altitude of the aerial access network equipment and the distance between the transmission of the aerial access network equipment and the UE, the distance between the UE and the center of the serving cell can be determined based on the Pythagorean Theorem.

In this way, the accurate calculation of the distance from the UE to the center of the serving cell can be realized, and the accuracy of the distance calculation from the UE to the serving cell can be improved.

In one embodiment, the distance between the UE and the aerial access network equipment is determined according to a time of flight of the wireless signal.

The UE can measure the time of flight of the wireless signal transmitted by the aerial access network equipment. The aerial access network equipment can carry the transmission time information of the wireless signal in the wireless signal, and the UE determines the time of flight of the wireless signal according to the reception time and the transmission time of the wireless signal. The UE can determine the flight distance of the wireless signal according to the time of flight of the wireless signal, that is, the distance between the UE and the aerial access network equipment.

In one embodiment, the method may include:

according to the location relationship of the UE with respect to the serving cell, determining whether to perform a neighbor cell measurement, or determine the frequency of performing the neighbor cell measurement.

For example, when it is determined that the UE is located within a certain distance from the edge of the serving cell based on the location relationship of the UE with respect to the serving cell (for example, the distance between the UE and the edge of the cell is less than a threshold), the UE may be made to perform neighbor cell measurement, or the UE may be made to increase the frequency of neighbor cell measurements. As the UE is farther away from the edge of the serving cell and is closer to the center of the serving cell, the frequency of neighbor cell measurements can be gradually reduced, or when the UE is within a certain range from the center of the serving cell, no neighbor cell measurement is performed. In this way, the purpose of saving terminal power is achieved.

In one embodiment, the method may include:

determining whether to perform an inter-cell handover according to the location relationship of the UE with respect to the serving cell.

Here, it may be determined whether to perform the inter-cell handover according to the location relationship between the UE and the serving cell.

For example, as shown in FIG. 5, when the difference of the angle of arrival α of the wireless signal minus the angle of arrival β is smaller than an angle threshold, it is determined that the UE is close to the edge of the serving cell, and the inter-cell handover can be performed.

As shown in FIG. 6, if the flight distance of the wireless signal received by the UE is less than the edge length, and the difference between the edge length and the flight distance of the wireless signal is less than a predetermined distance threshold, it is determined that the UE is close to the edge of the serving cell, and the inter-cell handover can be performed.

Here, the angle threshold and the predetermined distance threshold can be predetermined, can be broadcast to the UE by the aerial access network equipment via a system message, or sent to the UE via RRC signaling.

When the UE is in the connected state, if it is needed to perform the inter-cell handover, it can send the inter-cell handover request to the aerial access network equipment, and the aerial access network equipment determines whether to perform the inter-cell handover.

When the UE is in the idle state, if it is determined that the UE is close to the edge of the serving cell, the inter-cell handover may be performed, and the UE may determine to perform the cell reselection. When the UE performs the cell reselection, it may first perform radio signal measurement of neighbor cells, and the UE may determine the neighbor cell whose radio signal measurement result satisfies an inter-cell handover condition as a new serving cell for random access.

In one embodiment, the determining whether to perform an inter-cell handover according to the location relationship of the UE with respect to the serving cell includes one of the following:

performing a cell reselection in response to that the UE is in an idle state and the distance between the UE and the center point of the serving cell is greater than a distance threshold; and sending an inter-cell handover request to the aerial access network equipment in response to that the UE is in a connected state and the distance between the UE and the center point of the serving cell is greater than the distance threshold.

The UE can determine the distance between the UE and the center point of the serving cell according to the altitude of the aerial access network equipment and the angle of arrival of the wireless signal transmitted by the aerial access network equipment. Alternatively, the UE can determine the distance between the UE and the center point of the serving cell according to the altitude of the aerial access network equipment and the distance between the aerial access network equipment and the UE.

When the UE is in the idle state, if the UE determines that the distance between the UE and the center point of the serving cell is greater than the distance threshold, it may determine that the UE is close to the edge of the serving cell, and the inter-cell handover may be performed. At this time, the UE may determine to perform the cell reselection. When the UE performs the cell reselection, it may first perform radio signal measurement of neighbor cells, and the UE may determine the neighbor cell whose radio signal measurement result satisfies the handover condition as a new serving cell for random access.

When the UE is in the connected state, if the UE determines that the distance between the UE and the center point of the serving cell is greater than the distance threshold, it may determine that the UE is close to the edge of the serving cell, and the inter-cell handover may be performed. The UE may send the handover request to the aerial access network equipment, and the aerial access network equipment can determine whether to perform the inter-cell handover. The aerial access network equipment can initiate a cell handover process, instructing the UE to perform radio signal measurement of neighbor cells. According to the wireless signal measurement results of the neighbor cells reported by the UE, a neighbor cell that satisfies the conditions is selected as a new serving cell for the UE.

In one embodiment, the method also includes:
receiving indication information indicating the distance threshold.

The NTN base station may send the indication information indicating the distance threshold to the UE; the ground station of the NTN base station may also forward the indication information indicating the distance threshold to the UE via the NTN base station.

In one embodiment, the receiving the indication information indicating the distance threshold includes at least one of the following:
receiving the indication information indicating the distance threshold broadcast by the aerial access network equipment; and
receiving the radio resource control signaling sent by the aerial access network equipment and carrying the indication information indicating the distance threshold.

The aerial access network equipment may use the system message to carry the indication information indicating the distance threshold, and broadcast the system message to the UE. The UE in the idle state or connected state can receive the system message carrying indication information indicating the distance threshold, to determine the distance threshold.

The aerial access network equipment may use RRC signaling to carry indication information indicating the distance threshold. The UE in the connected state may receive the RRC signaling carrying the indication information indicating the distance threshold, to determine the distance threshold. Here, the RRC signaling may include: RRC measurement configuration signaling.

In one embodiment, the method also includes:
sending positioning information of the UE, wherein the positioning information is configured for the aerial access network equipment to determine the location of the UE in the serving cell.

The terminal UE can periodically report the positioning information to the aerial access network equipment such as the NTN base station, and the NTN base station and the alike can determine the positioning information reported by the UE as the location of the UE and compare it with the location information of the center of the serving cell to determine whether the UE is located at the edge of the serving cell. If the UE is located at the edge of the serving cell, the inter-cell handover process can be initiated.

The present disclosure also discloses a method for measuring neighbor cells, which can be applied to the UE. The method includes: determining by the UE the location relationship of the UE itself with respect to the serving cell associated with the aerial access network equipment; according to the location relationship of the UE with respect to the serving cell determining whether to perform neighbor cell measurement, or determine the frequency of neighbor cell measurement. For example, when it is determined that the UE is located within a certain distance from the edge of the serving cell according to the location relationship of the UE with respect to the serving cell (for example, the distance between the UE and the edge of the cell is less than a threshold), the UE may be made to perform neighbor cell measurement, or the UE may be made to increase the frequency of neighbor cell measurements. As the UE is farther away from the edge of the serving cell and is closer to the center of the serving cell, the frequency of neighbor cell measurements can be gradually reduced, or when the UE is within a certain range from the center of the serving cell, no neighbor cell measurement is performed. In this way, the purpose of saving terminal power is achieved.

Figure 8:
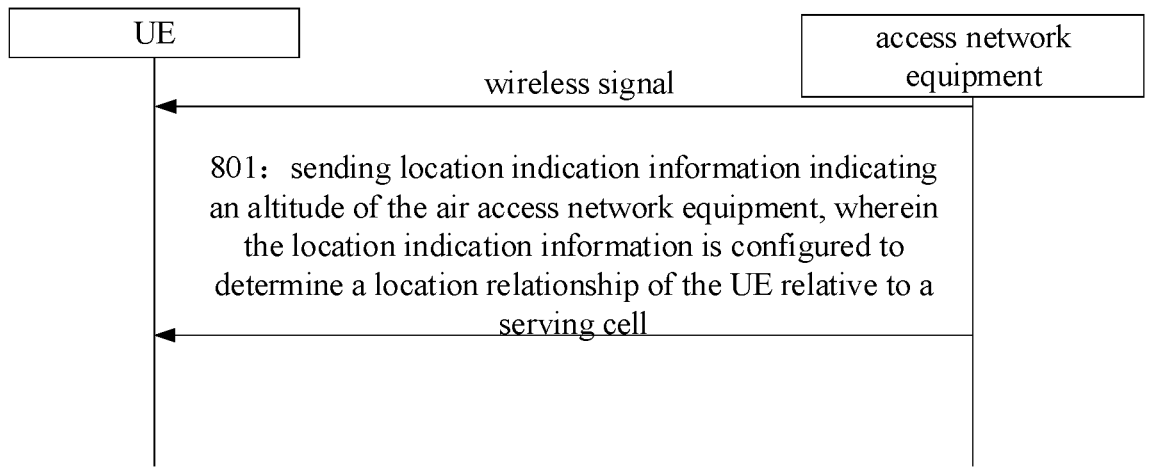
FIG. 8 is a diagram illustrating another downlink position determination according to an embodiment.

As shown in FIG. 8, this embodiment provides a method for determining a location, which can be applied to an aerial access network equipment for wireless communication. The method may include:

Step 801: sending location indication information indicating an altitude of the aerial access network equipment, wherein the location indication information is configured to determine a location relationship of the UE with respect to a serving cell.

The UE may be a mobile phone terminal or the like that uses cellular mobile communication network technology for wireless communication. The aerial access network equipment can be an NTN base station of a cellular mobile communication network, such as a satellite, or a small base station carried by a high-altitude balloon.

The measurement result may be the relative location relationship between the UE and the aerial access network equipment obtained by the UE based on the measurement of the transmission signal of the aerial access network equipment in the serving cell. For example, the UE may measure time of flight (TOF) of the transmission signal of the aerial access network equipment and the angle of arrival, etc.

The location indication information may be configured to indicate the position of the aerial access network equipment such as the NTN base station, for example, the altitude of the aerial access network equipment. Here, the altitude of the aerial access network equipment may be the vertical length from the aerial access network equipment to the ground. When the NTN base station and the like indicate the aerial access network equipment to transmit signals to the ground, the transmission is usually performed vertically to the ground, so a circular signal coverage area is formed on the ground. The center of the circular signal coverage area is the vertical projection point of the aerial access network equipment, which is also the center of the cell.

The NTN base station may send the location indication information to the UE through a broadcast system message or RRC signaling that carries the location indication information.

The NTN base station can directly send the location indication information to the UE, or the ground station of the NTN base station (that is, the ground base station) can send the location indication information to the UE via the NTN base station.

The UE establishes a communication connection with the NTN base station in the serving cell, and the NTN base station sends indication information to the UE to indicate the altitude of the NTN base station from the ground.

After the UE determines the altitude of the NTN base station from the ground, the UE can determine the distance from the UE to the center of the serving cell according to the measurement results such as the time of flight and angle of arrival of the signal and by using the Pythagorean Theorem.

Exemplarily, as shown in FIG. 5, the NTN base station transmits wireless signals to the ground in the air, to form a serving cell of the UE on the ground. The center point of the serving cell may be the vertical projection point of the NTN base station on the ground. In the cone signal coverage area, the angle between the cone edge and the cone base is β. If the arrival angle α of the wireless signal received by the UE is greater than or equal to β, the UE is considered to be inside the serving cell. If α is less than β, the UE is considered to be outside the serving cell. Here, the angle β between the cone edge and the cone base can be determined according to the beam of the NTN base station.

The UE can measure the time of flight of the signal transmitted by the NTN base station. When the NTN base station transmits the signal, the signal can carry information about the transmission time point. The UE can determine the time of flight of the signal based on the signal reception time point and the transmission time point in combination with the signal propagation speed. As shown in FIG. 6, in the cone signal coverage area formed by the serving cell, the longest time of flight of the signal transmitted by the NTN base station is the edge length of the cone. If the flight distance of the wireless signal received by the UE is less than or equal to the edge length of the cone, then it is considered that the UE is inside the serving cell, and if the flight distance is greater than the edge length, the UE is considered to be outside the serving cell. Here, the edge length of the cone can be determined according to the beam of the NTN base station.

As shown in FIG. 7, on the premise that the altitude of the aerial access network equipment and the angle of arrival of the wireless signal transmitted by the aerial access network equipment are known, the distance between the UE and the center of the serving cell can be determined based on trigonometric function relations and the like.

As shown in FIG. 6, the UE can determine the distance between the UE and the aerial access network equipment according to its own positioning information and the position of the aerial access network equipment such as satellites obtained from the ephemeris table. On the premise of knowing the altitude of the aerial access network equipment and the distance between the transmission of the aerial access network equipment and the UE, the distance between the UE and the center of the serving cell can be determined based on the Pythagorean Theorem.

In this way, the accurate calculation of the distance from the UE to the center of the serving cell can be realized, and the accuracy of the distance calculation from the UE to the serving cell can be improved.

In one embodiment, the method further includes:
receiving from the UE a positioning measurement result of a wireless signal transmitted by an aerial access network equipment to the serving cell; wherein the positioning measurement result indicates a location relationship of the UE with respect to an aerial access network equipment; and
determining the location relationship of the UE with respect to the serving cell according to the location indication information and the positioning measurement result.

The UE may send the measurement result to the base station, and the base station can determine the location of the UE in the serving cell.

The aerial access network equipment can determine the location relationship of the UE with respect to the aerial access network equipment based on the measurement results such as the time of flight and the angle of arrival of the signal and the altitude of the aerial access network equipment using the Pythagorean theorem, etc. The method for the aerial access network equipment to determine the location relationship of the UE with respect to the aerial access network equipment is similar to the method for the UE to determine the location relationship of the UE with respect to the aerial access network equipment, and will not be repeated here.

In this way, the accurate calculation of the distance from the UE to the center of the serving cell can be realized, and the accuracy of the distance calculation from the UE to the serving cell can be improved.

In one embodiment, the measurement result of the wireless signal includes: an angle of arrival of the wireless signal and/or a time of flight of the wireless signal.

In one embodiment, the measurement result of the wireless signal includes: the angle of arrival of the wireless signal and/or the time of flight of the wireless signal.

As shown in FIG. 7, on the premise that the altitude of the aerial access network equipment and the angle of arrival of the wireless signal transmitted by the aerial access network equipment are known, the distance between the UE and the center of the serving cell can be determined based on trigonometric function relations and the like.

As shown in FIG. 6, the UE can determine the straight-line distance (the flight distance of the wireless signal) between the UE and the aerial access network equipment according to the time of flight of the wireless signal transmitted by the aerial access network equipment. On the premise of knowing the altitude of the aerial access network equipment and the distance between the transmission of the aerial access network equipment and the UE, the distance between the UE and the center of the serving cell can be determined based on the Pythagorean Theorem.

In this way, the accurate calculation of the distance from the UE to the center of the serving cell can be realized, and the accuracy of the distance calculation from the UE to the serving cell can be improved.

In one embodiment, the method may include:
according to the location relationship of the UE with respect to the serving cell, determining whether to indicate the UE to perform a neighbor cell measurement, or indicate the UE to increase the frequency of performing the neighbor cell measurement.

For example, when it is determined that the UE is located within a certain distance from the edge of the serving cell based on the location relationship of the UE with respect to the serving cell (for example, the distance between the UE and the edge of the cell is less than a threshold), the UE may be made to perform neighbor cell measurement, or the UE may be made to increase the frequency of neighbor cell measurements. As the UE is farther away from the edge of the serving cell and is closer to the center of the serving cell, the frequency of neighbor cell measurements by the US can be gradually reduced, or when the UE is within a certain range from the center of the serving cell, no neighbor cell measurement is performed by the US. In this way, the purpose of saving terminal power is achieved.

In an embodiment, the aerial access network equipment may use control signaling such as RRC signaling or DCI signaling to indicate whether the UE performs the neighbor cell measurement, or to carry information associated with the frequency of the UE performing neighbor cell measurement. For example, the information may indicate a specific frequency for the UE to perform the neighbor cell measurement, or indicate an offset value that the UE should increase or decrease with respect to the current frequency of the neighbor cell measurement, or indicate the UE to increase or decrease the neighbor cell measurement frequency by a specific step.

In one embodiment, the method may include:
  receiving an inter-cell handover request, wherein the inter-cell handover request is sent in response to that a distance between the UE and a center point of the serving cell is greater than a distance threshold.

When the UE is in the idle state, if the UE determines that the distance between the UE and the center point of the serving cell is greater than the distance threshold, it may determine that the UE is close to the edge of the serving cell, and the inter-cell handover may be performed. At this time, the UE may determine to perform the cell reselection. When the UE performs the cell reselection, it may first perform radio signal measurement of neighbor cells, and the UE may determine the neighbor cell whose radio signal measurement result satisfies the handover condition as a new serving cell for random access.

In an embodiment, the method further includes: sending indication information indicating the distance threshold.

The NTN base station may send the indication information indicating the distance threshold to the UE; the ground station of the NTN base station may also forward the indication information indicating the distance threshold to the UE via the NTN base station.

In an embodiment, the sending indication information indicating the distance threshold includes at least one of the following:
  broadcasting the indication information indicating the distance threshold; and
  sending a radio resource control (RRC) signaling carrying the indication information indicating the distance threshold.

The aerial access network equipment may use the system message to carry the indication information indicating the distance threshold, and broadcast the system message to the UE. The UE in the idle state or connected state can receive the system message carrying indication information indicating the distance threshold, to determine the distance threshold.

The aerial access network equipment may use RRC signaling to carry indication information indicating the distance threshold. The UE in the connected state may receive the RRC signaling carrying the indication information indicating the distance threshold, to determine the distance threshold. Here, the RRC signaling may include: RRC measurement configuration signaling.

In one embodiment, the method further includes:
  receiving positioning information of the UE; and
  determining a location of the UE in the serving cell according to the center point of the serving cell and the positioning information of the UE.

The terminal UE can periodically report the positioning information to the aerial access network equipment such as the NTN base station, and the NTN base station and the alike can determine the positioning information reported by the UE as the location of the UE and compare it with the location information of the center of the serving cell to determine whether the UE is located at the edge of the serving cell. If the UE is located at the edge of the serving cell, the inter-cell handover process can be initiated.

In one embodiment, the method further includes:
  performing the inter-cell handover on the UE in response to that the location of the UE in the serving cell meets a handover condition.

When the aerial access network equipment determines the UE is located at the edge of the serving cell, the aerial access network equipment may initiate a cell handover procedure and instruct the UE to perform the radio signal measurement of neighbor cells. And based on the wireless signal measurement results of the neighbor cells reported by the UE, a neighbor cell that satisfies the conditions is selected as a new serving cell for the UE.

The present disclosure also discloses a method for measuring neighbor cells, which can be applied to the aerial access network equipment. The method includes: determining by the aerial access network equipment the location relationship of the UE with respect to the serving cell associated with the aerial access network equipment; according to the location relationship of the UE with respect to the serving cell determining whether to perform neighbor cell measurement, or determine the frequency of neighbor cell measurement. For example, when it is determined that the UE is located within a certain distance from the edge of the serving cell according to the location relationship of the UE with respect to the serving cell (for example, the distance between the UE and the edge of the cell is less than a threshold), the UE may be made to perform neighbor cell measurement, or the UE may be made to increase the frequency of neighbor cell measurements. As the UE is farther away from the edge of the serving cell and is closer to the center of the serving cell, the frequency of neighbor cell measurements can be gradually reduced, or when the UE is within a certain range from the center of the serving cell, no neighbor cell measurement is performed. In this way, the purpose of saving terminal power is achieved.

In an embodiment, the aerial access network equipment may use control signaling such as RRC signaling or DCI signaling to indicate whether the UE performs the neighbor cell measurement, or to carry information associated with the frequency of the UE performing neighbor cell measurement. For example, the information may indicate a specific frequency for the UE to perform the neighbor cell measurement, or indicate an offset value that the UE should increase or decrease with respect to the current frequency of the neighbor cell measurement, or indicate the UE to increase or decrease the neighbor cell measurement frequency by a specific step.

A specific example is provided below in combination with any of the above-mentioned embodiments:

The mechanism for determining the boundaries of NTN cells is as follows:
  1: In the scenario where the beam moves with the satellite, the satellite broadcasts the satellite altitude information to the covered area, and takes the center of the cell as the reference point with the terminal UE;
  2: The terminal UE can calculate the distance between the terminal UE and the reference point of the cell center through the real-time location information in the ephemeris, the satellite altitude information and the arrival and reception angle information of the reference signal received by the terminal UE, as shown in FIG. 2;

3: In the connected state, NTN gNB or terrestrial gNB configures the location threshold value for cell boundary determination to UE through RRC measurement configuration signaling. There are the following ways to determine whether the terminal UE is at the edge of the cell:

Periodic reporting method: the terminal UE periodically reports location information to NTN gNB or terrestrial gNB, and NTN gNB or terrestrial gNB compares the reported location information with the location information of the cell center to determine whether the UE is located at the edge of the cell;

Event-triggered reporting method: When the distance difference between the UE and the cell center location reference point is greater than the location threshold, it is determined that the UE is at the edge of the cell, and the terminal UE reports cell edge indication information.

4: In the idle state, NTN gNB or terrestrial gNB configures the location threshold value for cell boundary determination to the UE through broadcast signaling or RRC measurement configuration signaling. When the distance difference between the UE and the cell center location reference point is greater than the location threshold value, it is determined that the UE is at the edge of the cell, and triggers the measurement of neighbor cells;

In the idle state, it is judged whether the UE is in the cell edge area or the cell center area by setting different location thresholds. When the terminal UE is considered to be in the cell edge area, the UE triggers neighbor cell measurements. When the terminal UE is considered to be in the central area of the cell, the terminal UE may not perform measurement on neighbor cells in order to save power, as shown in FIG. 3.

Figure 9:
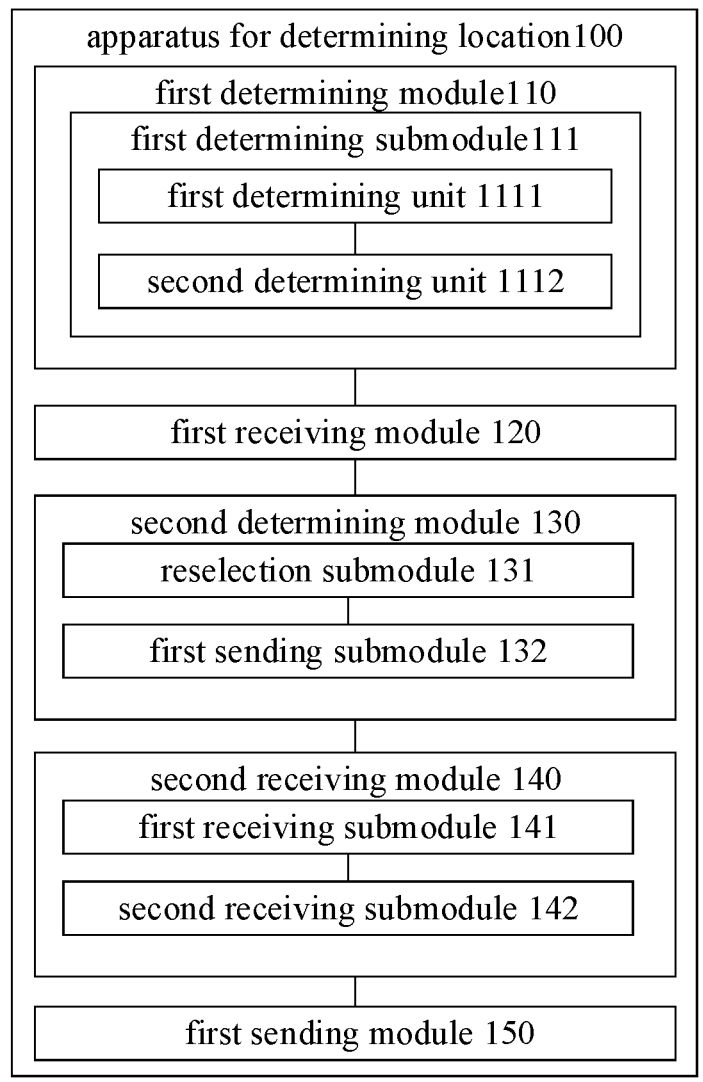
FIG. 9 is a block diagram of an apparatus for determining a location shown according to an embodiment.

The embodiment of the present disclosure also provides an apparatus for determining a location, which is applied to the first communication node of wireless communication. FIG. 9 is a schematic diagram of the structure of the apparatus 100 for determining a location provided by the embodiment of the present disclosure. As shown in FIG. 9, the apparatus 100 includes a first determining module 110,
  wherein the first determining module 110 is configured to determine a location relationship of the UE with respect to a serving cell according to a measured positioning measurement result of a wireless signal transmitted by an aerial access network equipment in the serving cell, wherein the positioning measurement result indicates a location relationship of the UE with respect to an aerial access network equipment.

In one embodiment, the apparatus 100 further includes:
a first receiving module 120 configured to receive location indication information indicating an altitude of the aerial access network equipment;
the first determining module 110 includes:
a first determining submodule 111 configured to determine a distance between the UE and a center point of the serving cell according to the location indication information and the positioning measurement result.

In one embodiment, the first determining submodule 111 includes at least one of the following:
a first determining unit 1111 configured to determine the distance between the UE and the center point of the serving cell according to the altitude of the aerial access network equipment and an angle of arrival of the wireless signal; and
a second determining unit 1112 configured to determine the distance between the UE and the center point of the serving cell according to the altitude of the aerial access network equipment and a distance between the UE and the aerial access network equipment.

In one embodiment, the distance between the UE and the aerial access network equipment is determined according to a time of flight of the wireless signal.

In one embodiment, the apparatus 100 further includes:
a second determining module 130 configured to determine whether to perform an inter-cell handover according to the location relationship of the UE with respect to the serving cell.

In one embodiment, the second determining module 130 includes one of the following:
a reselection submodule 131 configured to perform a cell reselection in response to that the UE is in an idle state and the distance between the UE and the center point of the serving cell is greater than a distance threshold; and
a first sending submodule 132 configured to send an inter-cell handover request to the aerial access network equipment in response to that the UE is in a connected state and the distance between the UE and the center point of the serving cell is greater than the distance threshold.

In one embodiment, the apparatus 100 further includes:
a second receiving module 140 configured to receive indication information indicating the distance threshold.

In one embodiment, the second receiving module 140 includes at least one of the following:
a first receiving submodule 141 configured to receive the indication information indicating the distance threshold broadcast by the aerial access network equipment; and
a second receiving submodule 142 configured to receive a radio resource control signaling sent by the aerial access network equipment and carrying the indication information indicating the distance threshold.

In one embodiment, the apparatus 100 further includes:
a first sending module 150 configured to send positioning information of the UE, wherein the positioning information is configured for the aerial access network equipment to determine the location of the UE in the serving cell.

Figure 10:
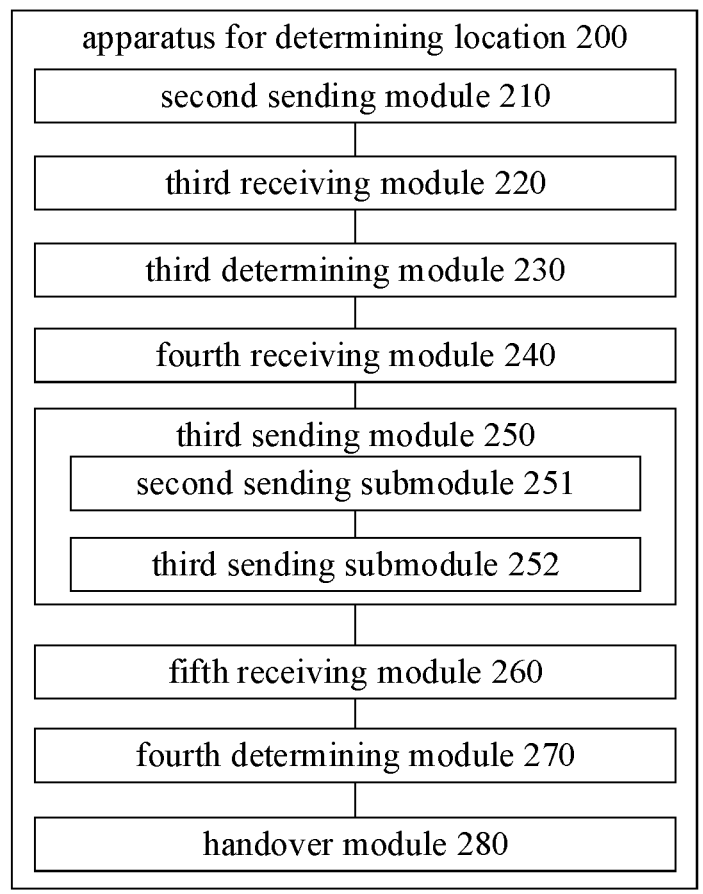
FIG. 10 is a block diagram of another apparatus for determining a location shown according to an embodiment.

The embodiment of the present disclosure also provides an apparatus for determining a location, which is applied to an aerial access network equipment of wireless communication. FIG. 10 is a schematic diagram of the structure of the apparatus 200 for determining a location provided by the embodiment of the present disclosure. As shown in FIG. 10, the apparatus 200 includes a second sending module 210,
  wherein the second sending module 210 is configured to send location indication information indicating an altitude of the aerial access network equipment, wherein the location indication information is configured to determine a location relationship of the UE with respect to a serving cell.

In one embodiment, the apparatus 200 further includes:
a third receiving module 220 configured to receive from the UE a positioning measurement result of a wireless signal transmitted by an aerial access network equipment to the serving cell; wherein the positioning measurement result indicates a location relationship of the UE with respect to an aerial access network equipment; and a third determining module 230 configured to determine the location relationship of the UE with respect to the serving cell according to the location indication information and the positioning measurement result.

In one embodiment, the positioning measurement result of the wireless signal includes: an angle of arrival of the wireless signal and/or a time of flight of the wireless signal.

In one embodiment, the apparatus 200 further includes:
a fourth receiving module 240 configured to receive an inter-cell handover request, wherein the inter-cell handover request is sent in response to that a distance between the UE and a center point of the serving cell is greater than a distance threshold.

In one embodiment, the apparatus 200 further includes:
a third sending module 250 configured to send indication information indicating the distance threshold.

In one embodiment, the third sending module 250 includes at least one of the following:
a second sending submodule 251 configured to broadcast the indication information indicating the distance threshold; and
a third sending submodule 252 configured to send a radio resource control RRC signaling carrying the indication information indicating the distance threshold.

In one embodiment, the apparatus 200 further includes:
a fifth receiving module 260 configured to receive positioning information of the UE; and
a fourth determining module 270 configured to determine a location of the UE in the serving cell according to the center point of the serving cell and the positioning information of the UE.

In one embodiment, the apparatus 200 further includes:
a handover module 280 configured to perform the inter-cell handover on the UE in response to that the location of the UE in the serving cell meets a handover condition.

In an embodiment, the first determining module 110, the first receiving module 120, the second determining module 130, the second receiving module 140, the first sending module 150, the second sending module 210, the third receiving module 220, the third determining modules 230, the fourth receiving module 240, the third sending module 250, the fifth receiving module 260, the fourth determining module 270 and the handover module 280 etc. may be implemented by one or more of central processing units (CPU), Graphics processing unit (GPU), baseband processor (BP), application-specific integrated circuit (ASIC), DSP, programmable logic device (PLD), complex programmable programmable Logic Device (CPLD), Field Programmable Gate Array (FPGA), General Processor, Controller, Microcontroller (MCU), Microprocessor (Microprocessor), or other electronic components, to perform the aforementioned method.

Figure 11:
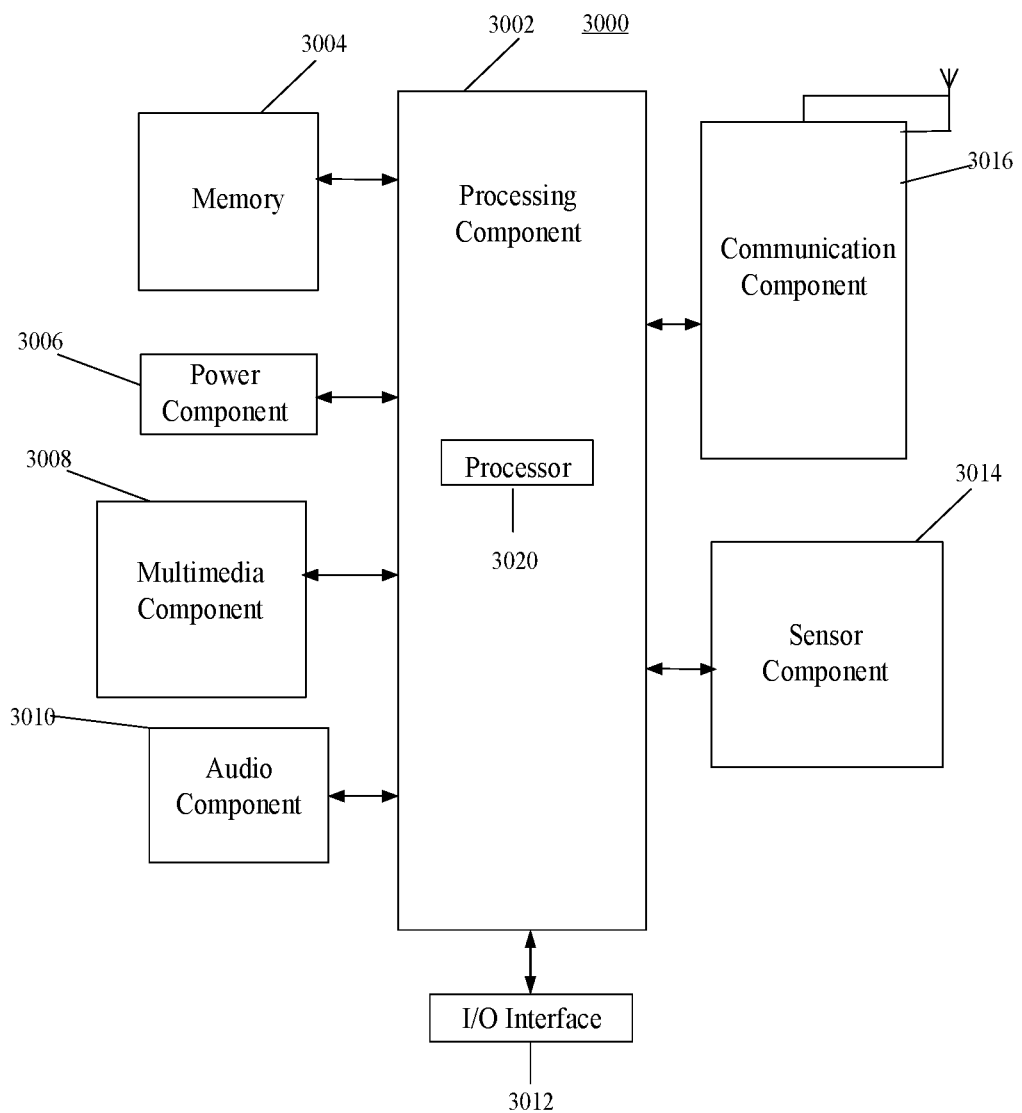
FIG. 11 is a block diagram of an apparatus for determining a location shown according to an embodiment.

FIG. 11 is a block diagram of an apparatus 3000 for determining a location shown according to an embodiment. For example, the apparatus 3000 may be a mobile phone, a computer, a digital broadcast terminal, a messaging device, a game console, a tablet device, a medical device, a fitness device, a personal digital assistant, and the like.

Referring to FIG. 11 the apparatus 3000 may include one or more of the following components: a processing component 3002, memory 3004, power supply component 3006, multimedia component 3008, audio component 3010, input/output (I/O) interface 3012, sensor component 3014, and a communication component 3016.

The processing component 3002 generally controls the overall operations of the apparatus 3000, such as those associated with display, phone calls, information transfer, camera operations, and recording operations. The processing component 3002 may include one or more processors 3020 to execute instructions to complete all or part of the steps of the above method. Additionally, processing component 3002 may include one or more modules that facilitate interaction between processing component 3002 and other components. For example, processing component 3002 may include a multimedia module to facilitate interaction between multimedia component 3008 and processing component 3002

The memory 3004 is configured to store various types of data to support operations at the apparatus 3000. Examples of such data include instructions for any application or method operating on apparatus 3000, contact data, phonebook data, messages, pictures, videos, and the like. The memory 3004 can be implemented by any type of volatile or non-volatile storage device or their combination, such as static random access memory (SRAM), electrically erasable programmable read-only memory (EEPROM), erasable programmable read only memory (EPROM), programmable read only memory (PROM), read only memory (ROM), magnetic memory, flash memory, magnetic or optical disk. Power component 3006 provides power to various components of apparatus 3000.

Power components 3006 may include a power management system, one or more power supplies, and other components associated with generating, managing, and distributing power for apparatus 3000.

The multimedia component 3008 includes a screen that provides an output interface between the apparatus 3000 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or a swipe action, but also detect duration and pressure associated with the touch or swipe operation. In some embodiments, the multimedia component 3008 includes a front camera and/or a rear camera. When the apparatus 3000 is in an operation mode, such as a shooting mode or a video mode, the front camera and/or the rear camera can receive external multimedia data. Each front camera and rear camera can be a fixed optical lens system or have focal length and optical zoom capability.

The audio component 3010 is configured to output and/or input audio signals. For example, the audio component 3010 includes a microphone (MIC), which is configured to receive external audio signals when the apparatus 3000 is in operation modes, such as call mode, recording mode and voice recognition mode. Received audio signals may be further stored in memory 3004 or transmitted via communication component 3016. In some embodiments, the audio component 3010 also includes a speaker for outputting audio signals.

The I/O interface 3012 provides an interface between the processing component 3002 and a peripheral interface module, which may be a keyboard, a click wheel, a button, and the like. These buttons may include, but are not limited to: a home button, volume buttons, start button, and lock button.

Sensor assembly 3014 includes one or more sensors for providing status assessments of various aspects of apparatus 3000. For example, the sensor component 3014 can detect the open/closed state of the apparatus 3000, the relative positioning of components, such as the display and keypad of the apparatus 3000, the sensor component 3014 can also detect a change in the position of the apparatus 3000 or a component of the apparatus 3000, the user presence or absence of contact with apparatus 3000, apparatus 3000 orientation or acceleration/deceleration and temperature change of apparatus 3000. Sensor assembly 3014 may include a proximity sensor configured to detect the presence of nearby objects in the absence of any physical contact. The sensor assembly 3014 may also include an optical sensor, such as a CMOS or CCD image sensor, for use in imaging applications. In some embodiments, the sensor component 3014 may also include an acceleration sensor, a gyroscope sensor, a magnetic sensor, a pressure sensor or a temperature sensor.

The communication component 3016 is configured to facilitate wired or wireless communication between the apparatus 3000 and other devices. The device 3000 can access wireless networks based on communication standards, such as Wi-Fi, 2G or 3G or a combination thereof. In an embodiment, the communication component 3016 receives broadcast signals or broadcast related information from an external broadcast management system via a broadcast channel. In an embodiment, the communication component 3016 also includes a near field communication (NFC) module to facilitate short-range communication. For example, the NFC module may be implemented based on Radio Frequency Identification (RFID) technology, Infrared Data Association (IrDA) technology, Ultra Wide Band (UWB) technology, Bluetooth (BT) technology and other technologies.

In an embodiment, apparatus 3000 may be programmed by one or more application specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the methods described above.

In an embodiment, there is also provided a non-transitory computer-readable storage medium including instructions, such as the memory 3004 including instructions, which can be executed by the processor 3020 of the device 3000 to implement the above method. For example, the non-transitory computer readable storage medium may be ROM, random access memory (RAM), CD-ROM, magnetic tape, floppy disk, optical data storage device, and the like.

Embodiments of the present disclosure provide a method and apparatus for determining a location, a communication device and a storage medium. The UE determines a location relationship of the UE relative to a serving cell according to a measured positioning measurement result of a wireless signal transmitted by an air access network device in the serving cell, wherein the positioning measurement result indicates a location relationship of the UE relative to an air access network device. Thus, for mobile air access network device such as NTN base stations, the relative location of the UE and the air access network device is determined by measuring the wireless signal of the serving cell, to further determine the location relationship between the UE and the serving cell, and the precision of location determination in the serving cell by the UE is improved. Furthermore, it is possible to accurately determine whether to perform an inter-cell handover, and reduce inaccuracy in determining the timing of handover by using the reception strength of wireless signal and the like.

Other implementations of the embodiments of the disclosure will be readily apparent to those skilled in the art from consideration of the specification and practice of the disclosure disclosed herein. This application is intended to cover any modification, use or adaptation of the embodiments of the present disclosure, these modifications, uses or adaptations follow the general principles of the embodiments of the present disclosure and include those in the technical field not disclosed by the embodiments of the present disclosure Common knowledge or common technical means. The specification and examples are to be considered exemplary only, with a true scope and spirit of the embodiments of the disclosure being indicated by the following claims.

It should be understood that the embodiments of the present disclosure are not limited to the precise structures described above and shown in the drawings, and various modifications and changes can be made without departing from the scope thereof. The scope of embodiments of the present disclosure is limited only by the appended claims.

What is claimed is:

1. A method for determining a location, performed by a user equipment (UE), the method comprising:
   determining a location relationship of the UE with respect to a serving cell according to a measured positioning measurement result of a wireless signal transmitted by an aerial access network equipment in the serving cell, wherein the positioning measurement result indicates a location relationship of the UE with respect to the aerial access network equipment; and
   receiving location indication information indicating a location of the aerial access network equipment;
   wherein determining the location relationship of the UE with respect to the serving cell according to the measured positioning measurement result of the wireless signal transmitted by the aerial access network equipment in the serving cell comprises:
   determining a distance between the UE and a center point of the serving cell according to the location indication information and the positioning measurement result.

2. The method of claim 1, wherein determining the distance between the UE and the center point of the serving cell according to the location indication information and the positioning measurement result comprises at least one of:
   determining the distance between the UE and the center point of the serving cell according to the location of the aerial access network equipment and an angle of arrival of the wireless signal; and
   determining the distance between the UE and the center point of the serving cell according to the location of the aerial access network equipment and a distance between the UE and the aerial access network equipment.

3. The method of claim 2, wherein the distance between the UE and the aerial access network equipment is determined according to a time of flight of the wireless signal.

4. The method of claim 1, further comprising one of:
   performing a cell reselection in response to determining that the UE is in an idle state and the distance between the UE and the center point of the serving cell is greater than a distance threshold; or
   sending an inter-cell handover request to the aerial access network equipment in response to determining that the UE is in a connected state and the distance between the UE and the center point of the serving cell is greater than the distance threshold.

5. The method of claim 4, further comprising:
receiving indication information indicating the distance threshold.

6. The method of claim 5, wherein receiving the indication information indicating the distance threshold comprises at least one of:
receiving the indication information indicating the distance threshold broadcast by the aerial access network equipment; and
receiving a radio resource control (RRC) signaling sent by the aerial access network equipment and carrying the indication information indicating the distance threshold.

7. The method of claim 1, further comprising:
sending positioning information of the UE to the aerial access network equipment, wherein the positioning information of the UE is configured for the aerial access network equipment to determine the location of the UE in the serving cell.

8. A method for determining a location, performed by an aerial access network equipment, the method comprising:
sending location indication information indicating a location an altitude of the aerial access network equipment, wherein the location indication information is configured to determine a location relationship of a user equipment (UE) with respect to a serving cell;
receiving from the UE a positioning measurement result of a wireless signal transmitted by the aerial access network equipment to the serving cell, wherein the positioning measurement result indicates a location relationship of the UE with respect to the aerial access network equipment; and
determining the location relationship of the UE and a center point of the serving cell according to the location indication information and the positioning measurement result.

9. The method of claim 8, wherein the positioning measurement result of the wireless signal comprises at least one of: an angle of arrival of the wireless signal or a time of flight of the wireless signal.

10. The method of claim 8, further comprising:
receiving an inter-cell handover request, wherein the inter-cell handover request is sent in response to determining that a distance between the UE and a center point of the serving cell is greater than a distance threshold.

11. The method of claim 10, further comprising:
sending indication information indicating the distance threshold.

12. The method of claim 11, wherein sending indication information indicating the distance threshold comprises at least one of:
broadcasting the indication information indicating the distance threshold; and
sending a radio resource control (RRC) signaling carrying the indication information indicating the distance threshold.

13. The method of claim 8, further comprising:
receiving positioning information of the UE; and
determining a location of the UE in the serving cell according to the center point of the serving cell and the positioning information of the UE.

14. The method of claim 13, further comprising:
performing an inter-cell handover on the UE in response to determining that the location of the UE in the serving cell meets a handover condition.

15. An aerial access network equipment, comprising:
a processor; and
a memory, coupled to the processor, and stored with a computer executable program;
wherein the processor is configured to perform the method of claim 8.

16. A user equipment (UE), comprising:
a processor; and
a memory, coupled to the processor, and stored with a computer executable program,
wherein the processor is configured to:
determine a location relationship of the UE with respect to a serving cell according to a measured positioning measurement result of a wireless signal transmitted by an aerial access network equipment in the serving cell, wherein the positioning measurement result indicates a location relationship of the UE with respect to the aerial access network equipment; and
receive location indication information indicating a location of the aerial access network equipment;
wherein when determines the location relationship of the UE with respect to the serving cell according to the measured positioning measurement result of the wireless signal transmitted by the aerial access network equipment in the serving cell, the processor is configured to:
determine a distance between the UE and a center point of the serving cell according to the location indication information and the positioning measurement result.

* * * * *